United States Patent [19]

Aydin et al.

[11] Patent Number: 4,980,404

[45] Date of Patent: Dec. 25, 1990

[54] ADHESIVES FOR ADHESIVE BONDS HAVING INCREASED HIGH-TEMPERATURE STRENGTH

[75] Inventors: Oral Aydin; Hans Kast, both of Mannheim, Fed. Rep. of Germany

[73] Assignee: BASF Aktiengesellschaft, Ludwigshafen, Fed. Rep. of Germany

[21] Appl. No.: 319,888

[22] Filed: Mar. 7, 1989

Related U.S. Application Data

[63] Continuation of Ser. No. 127,383, Dec. 2, 1987, abandoned.

[30] Foreign Application Priority Data

Dec. 12, 1986 [DE] Fed. Rep. of Germany ....... 3642485

[51] Int. Cl.$^5$ ................................................ C08K 5/34
[52] U.S. Cl. .................................... 524/100; 524/253; 524/503
[58] Field of Search .................... 524/100, 253, 502

[56] References Cited

U.S. PATENT DOCUMENTS

| | | | |
|---|---|---|---|
| 2,802,799 | 8/1957 | Johnson | 524/253 |
| 2,903,436 | 9/1959 | Lehmann et al. | 524/253 |
| 3,321,432 | 5/1967 | Strasser et al. | 524/253 |
| 3,352,806 | 11/1967 | Hicks | 524/253 |
| 3,786,113 | 1/1974 | Vassileff | 525/113 |
| 4,082,884 | 4/1978 | DeLong | 524/502 |
| 4,339,365 | 7/1982 | Becker et al. | 524/502 |
| 4,442,247 | 4/1984 | Ishikura et al. | 524/502 |
| 4,504,609 | 3/1985 | Kuwajima et al. | 524/502 |
| 4,510,274 | 4/1985 | Okazaki et al. | 524/502 |
| 4,518,724 | 2/1985 | Kuwajima et al. | 524/502 |
| 4,532,273 | 7/1985 | Kadowski et al. | 523/402 |

FOREIGN PATENT DOCUMENTS

| | | | |
|---|---|---|---|
| 0558606 | 6/1958 | Canada | 524/253 |
| 0027414 | 7/1974 | Japan | 524/253 |
| 0087186 | 7/1975 | Japan | 524/253 |
| 58-098373 | 6/1983 | Japan . | |
| 0710608 | 1/1980 | U.S.S.R. | 524/253 |
| 0726466 | 3/1955 | United Kingdom | 524/253 |

OTHER PUBLICATIONS

Chemical Abstracts, band 77, No. 20, Nov. 13, 1972, abstract No. 128016s, "Adhesive Compositions", Dainippon Ink & Chemicals.

Primary Examiner—Joseph L. Schofer
Assistant Examiner—J. M. Reddick
Attorney, Agent, or Firm—Oblon, Spivak, McClelland, Maier & Neustadt

[57] ABSTRACT

One-component adhesives for adhesive bonds having increased high-temperature strengths contain (A) aqueous dispersions of carboxyl-containing polyacrylates and (B) organic polyamino compounds having a molecular weight of from 250 to 15,000 and an amino functionality greater than 5.

6 Claims, No Drawings

ADHESIVES FOR ADHESIVE BONDS HAVING INCREASED HIGH-TEMPERATURE STRENGTH

This application is a continuation of U.S. patent application Ser. No. 07/127,383, filed on Dec. 2, 1987, now abandoned.

The present invention relates to adhesives based on aqueous polymer dispersions and organic polyamino compounds for adhesive bonds having increased high-temperature strength.

It is known that adhesive bonds having good high temperature strength can be produced from aqueous dispersions of methylol-containing polymers. However, the adhesive films must be crosslinked for a fairly long time at above 130° C. in order to achieve good high-temperature strengths. Hence, adhesives of this type cannot be used for bonding heat-sensitive plastic films to other substrates.

JA-A-58098-373 discloses two-component adhesives which contain, firstly, a mixture of a copolymer of a reaction product of a (meth)acrylate which has a tertiary amino group with an epichlorohydrin and a (co)-polymer of isobornyl (meth)acrylate and, secondly, a curing agent based on a polyethyleneimine solution. Two-component adhesives of this type can be used for bonding interior trim in automotive construction and have good hightemperature strength. Furthermore, U.S. Pat.4,532,273 discloses two-component adhesives which contain, firstly, an aqueous dispersion of a (co)-polymer of a (meth)acrylate which has a tertiary amino group with an epihalohydrin, secondly a tackifying resin, thirdly an epoxide compound and, fourthly, a curing agent having an amino group. Examples of suitable curing agents are nylon resins, nylon/polyamine resins and imidazole compounds. However, these adhesives prepared from 2 or more components do not have a long shelf life and therefore have to be processed shortly after their preparation. This is a disadvantage in practice.

Although two-component polyurethane adhesives which contain organic solvents give good adhesive bonds, the organic solvents lead to environmental pollution.

It is an object of the present invention to provide adhesives which have a shelf life of not less than 6 months, can be processed at room temperature or slightly elevated temperatures and give adhesive bonds which possess good cohesion and adhesion even at elevated temperatures.

We have found that this object is achieved and that adhesives which contain (A) an aqueous dispersion of a copolymer of from 50 to 98.5%, based on the weight of the copolymer, of (meth)acrylates of alkanols of 1 to 12 carbon atoms, from 0.5 to 10%, based on the weight of the copolymer, of (meth)acrylonitrile, from 0.5 to 4%, based on the weight of the copolymer, of an $\alpha,\beta$-monoolefinically unsaturated carboxylic acid, from 0 to 10%, based on the weight of the copolymer, of vinyl esters of saturated carboxylic acids of 2 to 4 carbon atoms, styrene and/or butadiene and from 0 to 5%, based on the weight of the copolymer, of hydroxyalkyl (meth)acrylates where alkyl is of 2 to 8 carbon atoms, and (B) an organic polyamino compound having a molecular weight of 250 to 15,000 and an amino functionality greater than 5 have a long shelf life, can be applied at room temperature or slightly elevated temperatures to the surfaces to be bonded, and give adhesive bonds having increased high-temperature strength.

A preferred composition is a one component adhesive for adhesive bonds having increased high-temperature strength, which contains (A) an aqueous dispersion of a copolymer of components:

(a) from 50 to 98.5%, based on the weight of the copolymer, of (meth)acrylates of alkanols of 1 to 12 carbon atoms,
(b) from 0.5 to 4%, based on the weight of the copolymer, of a copolymerizable carboxylic acid selected from the group consisting of $\alpha,\beta$-monoolefinically unsaturated carboxylic acid of 3 to 5 carbon atoms, acrylamidoglycollic acid and methacrylamidoglycollic acid,
(c) from 0 to 10%, based on the weight of the copolymer, of monomers selected from the group consisting vinyl esters of saturated carboxylic acids of 2 to 4 carbon atoms, styrene, acrylonitrile, methacrylonitrile and butadiene and
(d) from 0 to 5%, based on weight of the copolymer, of monomers selected from the group consisting of hydroxyalkyl (meth)acrylates where alkyl is of 2 to 8 carbon atoms, N-hydroxyalkyl amides of carboxylic acids of 3 to 5 carbon atoms and alkoxyalkyl amides of carboxylic acids of 3 to 5 carbon atoms, having a glass transition temperature of up to +40° C., and having a solids content of from 50 to 65% by weight, based on the dispersion, and (B) an organic polyamino compound having a molecular weight of from 250 to 15,000 and an amino functionality greater the 5, selected from the group consisting of polyethyleneimines, N,N'-N"-tris-(2-aminoethyl)-melamine and N,N',N"-tris-(6-aminohexyl)-melamine, the weight ratio of copolymer to organic polyamino compound being from 100:0.01 to 100:3.

The aqueous copolymer dispersions (A) can be prepared in a conventional manner by emulsion copolymerization of the monomers in an aqueous medium using the conventional dispersants and water-soluble polymerization catalysts which form free radicals.

Particularly suitable (meth)acrylates are methyl acrylate, ethyl acrylate, n-butyl acrylate and methacrylate, isobutyl acrylate and methacrylate, 2-ethylhexyl acrylate and methacrylate as well as n-hexyl acrylate, n-octyl acrylate and methacrylate, decyl acrylate and dodecyl acrylate. Particularly suitable $\alpha,\beta$-monoolefinically unsaturated carboxylic acids are mono- and dicarboxylic acids of 3 to 5 carbon atoms, such as acrylic acid, methacrylic acid, fumaric acid, maleic acid, itaconic acid and crotonic acid. Particularly suitable vinyl esters are vinyl acetate and vinyl propionate as well as vinyl butyrate. Particularly suitable hydroxyalkyl (meth)acrylates are 2-hydroxyethyl acrylate and methacrylate, 4-hydroxybutyl acrylate and methacrylate, 6-hydroxyhexyl acrylate and methacrylate and 8-hydroxyoctyl acrylate and methacrylate.

The solids content of the aqueous dispersions (A) is in general from 30 to 70, in particular from 50 to 65, % by weight, based on the dispersion. Suitable dispersants for the preparation of the dispersions (A) by emulsion polymerization are the conventional anionic and, if required, nonionic emulsifiers in the usual amounts of from 0.5 to 3, in particular from 1 to 2, % by weight, based on the monomers. Examples of these are sodium laurylsulfate, sodium dodecylbenzenesulfonate and the alkali metal salts of acidic sulfuric esters of alkylene oxides of octyl- or nonylphenol, which generally contain from 5 to 50 moles of, in particular, ethylene oxide units, and ethylene oxide adducts of fatty alcohols containing in general from 5 to 50 moles of ethylene oxide units. Particularly suitable water-soluble polymerization initiators are peroxydisulfates, such as potassium peroxydisulfate, and redox systems, such as hydrogen peroxide/sodium formaldehyde sulfoxylate, and the emulsion polymerization can be carried out in general at from 30° to 150° C., in particular from 50° to 90° C. For the preparation of the dispersions (A), it is furthermore advantageous to employ a pH of from 3 to 9, so that the dispersions are sufficiently stable to pH changes. The aqueous polymer dispersions (A) preferably contain both anionic and nonionic emulsifiers of the stated type.

Particularly suitable organic polyamino compounds (B) are polyethyleneimines having molecular weights of from 250 to 15,000, in particular from 250 to 10,000. Polyethyleneimines of this type have an amino functionality greater than 5. Melamine derivatives, such as N,N',N"-tris-(2-aminoethyl)-melamine and N,N'N"-tris(6-aminohexyl)-melamine are also suitable. Provided that they are water-insoluble, such polyamino compounds are preferably added to the aqueous dispersions (A) in the form of solutions in organic solvents, such as acetone and toluene, or as aqueous solutions of the protonation products, which can be obtained, for example, by reaction with carbonic acid or with ammonium bicarbonate. The molecular weights of the polyamino compounds can be determined in a conventional manner, for example by the light scattering method. In the novel one-component adhesives, the content of polyamino compounds (B) can be varied within wide limits. It is generally from 0.01 to 3, preferably from 0.01 to 1.5, % by weight, based on the solids content of the dispersion (A). If, together with the aqueous polymer dispersions (A), low molecular weight polyamino compounds, such as 3-(2-aminoethyl)aminopropylamine, dipropylenetriamine, N,N'-bis-(3-aminopropyl)-ethylenediamine, 4,9-dioxadodecane-1,12-diamine or 4,7,10-trioxatridecane-1,13-diamine, are used as curing agents, the resulting adhesive bonds do not possess improved high-temperature strength. On the other hand, if, for example, polyethyleneimines having a molecular weight greater than 15,000, for example from 25,000 to 30,000, are used together with the aqueous polymer dispersions (A), the resulting adhesives do not have a long shelf life since in this case coagulation or gelling of the mixtures occurs after mixing.

The solids content of the novel one-component adhesives is in general from 30 to 70, preferably from 50 to 65, % by weight and the pH is generally from 4 to 9. To improve the adhesive properties, other resins conventionally employed in the adhesives sector, for example hydrocarbon resins, ester resins, natural resins and rosin derivatives, fillers, e.g. chalk and barium sulfate, plasticizers and/or film-forming assistants may be added to the novel one-component adhesives. The resulting formulations also have a long shelf life and are particularly suitable for the production of adhesive bonds having good high-temperature strength, in particular for bonding plastic films to laminates and/or metals and to wood and, if desired, coated papers and cardboards.

In the Examples which follow, parts and percentages are by weight, unless stated otherwise. Preparation of the polymer dispersions 1 to 10

180 parts of water, 0.8 part of potassium peroxydisulfate, 0.06 part of the sodium salt of a sulfated reaction product of p-isooctylphenol with 25 moles of ethylene oxide and 0.06 part of a reaction product of p-isooctylphenol with 25 moles of ethylene oxide and 6.5 parts of the particular monomer mixture (having the composition stated in Table 1) are heated to 85° C. in a reaction vessel provided with a stirrer and feed vessels. After 15 minutes, an emulsion of 100 parts of water, 6.0 parts of each of the abovementioned emulsifiers and 650 parts of the monomer mixture are fed in uniformly in the course of 2 hours. At the same time, a solution of 2.5 parts of potassium peroxydisulfate in 80 parts of water is fed in separately. The contents of the reaction vessel are then kept at 85° C. for a further hour. After the mixture has been cooled, the pH is brought to 5 with ammonia water; in order to improve the stability of the dispersions (no. 4 and 6), it is advantageous once again to add up to 6 parts of emulsifier.

TABLE 1

| Dispersion | Monomer composition, % by wt. | SC, % by wt. | pH |
|---|---|---|---|
| 1 | 89 BA; 5 VAc; 3 AN; 2 HEA; 1 AS | 60.1 | 4.8 |
| 2 | 88 EHA; 9 AN; 3 AS; | 50.0 | 4.5 |
| 3 | 60 BA; 30 MMA; 5 VAc; 3 AN; 2 AS | 64.8 | 4.8 |
| 4 | 76 BA; 17 MMA; 5 VAc; 2 AS | 65.2 | 5.2 |
| 5 | 76 BA; 20 MMA; 2 HEA; 2 AS | 65.3 | 5.2 |
| 6 | 97 BA; 1 AS; 2 HEA | 65.6 | 5.7 |
| 7 | 97 BA; 3 AS | 50.0 | 5.2 |
| 8 | 76 BA; 10 AN; 10 VAc; 3 HEMA; 1 AS | 60.2 | 5.4 |
| 9 | 88 BA; 5 AN; 5 VAc; 1 AS; 1 DAAM | 55.6 | 5.0 |
| 10 | 97 BA; 2 HEMA; 1 AS | 60.7 | 5.8 |

In the Table, the abbreviations have the following meanings:
SC: solids content of the dispersion
BA: butyl acrylate
EHA: ethylhexyl acrylate
MMA: methyl methacrylate
AN: acrylonitrile
VAc: vinyl acetate
HEA: hydroxyethyl acrylate
HEMA: hydroxy methacrylate
AS: acrylic acid
DAAM: diacetoneacrylamide

PRODUCTION AND TESTING OF ADHESIVE
EXAMPLES 1 TO 5

The polyamino compounds stated in Table 2 (1%, based on the solids content of the dispersion) are added to dispersion 1, which is then applied to silicone paper in a thickness of 100 μm. The dispersion is dried in the air for 3 minutes, after which a woven cotton fabric is placed in the still moist adhesive layer and the adhesive bond is dried at room temperature. After removal of the silicone paper, 2 cm wide strips of the resulting structure are bonded, under slight pressure, to a metal sheet provided with a primer. After storage for 2 days at room temperature, the adhesive bond is subjected to a high-temperature strength test in a through-circulation drier under the following conditions:

Load on cotton fabric: 50g/2 cm at 90° C.
Temperature: 10 minutes in each case at the stated temperatures Heating rate between the temperature ranges: 1° C./min
Measurement carried out: separation distance in mm
The results are summarized in Table 2 below.

TABLE 2

High-temperature strength test for dispersion 1 and various polyamino compounds

| Addition of (1% in each case) | 50 | 60 | 80 | 100 | 120 | 140 | 150° C. |
|---|---|---|---|---|---|---|---|
| | | | | Separation distance in mm | | | |
| Example | | | | | | | |
| 1 Polyethyleneimine MW 800 | — | — | — | — | — | — | 2 |
| 2 Polyethyleneimine MW 2000 | — | — | — | — | — | — | 1 |
| 3 Polyethyleneimine MW 800 | — | — | — | — | — | — | 1 |
| 4 Triaminoethylmelamine from NH$_4$H CO$_3$ solution | — | — | — | — | — | 2 | 2 |
| 5 Triaminohexylmelamine from NH$_4$H CO$_3$ solution | — | — | — | — | — | 1 | 1 |
| Comparative Experiments | | | | | | | |
| (a) None | — | 2 | 2 | 9 | 12 | 14 | 14 |
| (b) 1,2-diaminopropane | — | — | 3 | 3 | 15 | 18 | 18 |
| (c) 4,7,10-trioxatridecane-1,13-diamine | | | 4 | 4 | 8 | 14 | 18 |
| (d) 3-(2-aminoethyl)-aminopropylamine | | | 1 | 1 | 14 | 17 | 17 |
| (e) N,N'-bis-(3-aminopropyl)-ethylenediamine | | | 1 | 1 | 14 | 22 | 24 |

EXAMPLES 6 TO 10

Dispersion 2 to which the polyamino compounds have been added is applied to a polypropylene film pretreated by corona discharge, in an amount such that the resulting dry layer is 25 μm thick, and the dispersion is dried at room temperature. 5 mm wide strips of the film provided with the adhesive are bonded to a polished steel plate by rolling a 2.5 kg weight on top. After storage for one day at room temperature, the high-temperature strengths of the adhesive bonds are tested at 90° C. in a through-circulation drier under a load of 100 g at an angle of 90°. The distance run in mm/hour is determined.

TABLE 3

| | Additive | Amount in % | Distance run in mm/hour |
|---|---|---|---|
| Example | | | |
| 6 | Polyethyleneimine MW 800 | 1 | 1 |
| 7 | Polyethyleneimine MW 800 | 0.5 | 1 |
| 8 | Polyethyleneimine MW 800 | 0.1 | 7 |
| 9 | Polyethyleneimine MW 2000 | 1 | 0 |
| 10 | Polyethyleneimine MW 4700 | 1 | 0 |
| Comparative Experiments | | | |
| f | Without | — | 58 |
| g | 1,2-diaminopropane | 1 | 90 |
| h | 3-(2-aminoethyl)-aminopropylamine | 1 | 45 |
| i | N,N''-bis(3-aminopropyl)-ethylenediamine | 1 | 64 |

EXAMPLES 10 TO 15

Polyethyleneimine having a molecular weight of 800 (0.2%, based on the solids content of the dispersion) is added to the dispersions 3 to 8. The mixtures are applied to a pressboard panel (about 100 g/m² wet), and a cotton fabric (sailcloth) is placed in the still wet adhesive layer. After storage for 2 days, the high-temperature of the adhesive bonds is investigated in a through-circulation drier.

The high temperature strength was determined at 90° C. and at an angle of 90° under a load of 500 g/5 cm. The distance separated in mm/hour at elevated temperature is measured.

In order to make the action of the polyamino compound comparable for the various dispersions, the running distance of the experiments with polyamino compounds is expressed as a percentage of that of pure dispersion, the running distance of the pure dispersion being 100%.

TABLE 4

| Example | Dispersion | | Running distance after addition of polyethyleneamine |
|---|---|---|---|
| 11 | 3 | | 60% |
| 12 | 4 | | 0   no separation |
| 13 | 5 | +poly-ethyleneimine | 65% |
| 14 | 6 | | 80% |
| 15 | 7 | | 50% |
| 16 | 8 | | 40% |

EXAMPLE 17

2%, based on the solids content of the dispersion, of polyethyleneimine (MW=800) are added to dispersion 9. The resulting mixture is applied to a doubly skived, extruded polystyrene sheet in an amount of 80 g/cm² (solid) and dried for about 6 minutes at 80° C. A PVC foam sheet is placed on the still warm polystyrene sheet and pressed on for a short time.

The high-temperature strength of the adhesive bond is then tested in a through-circulation oven at 90° C. under a peeling load of 200 g per 5 cm test strip width at an angle of 180°. The separation distance is measured as a function of the time under load and is found to be 0.3 cm/hour. In comparison, the separation distance for the adhesive bond with dispersion 9 alone is 21 cm/hour.

EXAMPLES 18 TO 21

Solutions of various resins in toluene are added to dispersion 10, in an amount of 10% (solid) based on the solids content of the dispersion. If necessary, 0.5% (based on the solids content of he dispersion+resin) of polyethleneamine (MW=2000) is furthermore added to the resulting, resin-containing dispersions.

The adhesive mixtures (with and without the without the addition of polyethyleneimine) are tested to determine their high-temperature strength in an adhesive bond between polystyrene and polyvinyl chloride, as described in Example 17. For comparison, the separation distance in Table 5 below is based on the polyethyleneimine-free adhesive bonds, which are made equivalent of 100%, and is expressed as a percentage.

TABLE 5

| Example | Resin | Polyethyleneimine | Separation distance in %, based on polyethyleneimine-free bond |
|---|---|---|---|
| 18 | Commercial urea/aldehyde resin | 0.5% | 70 |
| 19 | Commercial resin | 0.5% | 50 |
| 20 | Commercial styrene/-methylstyrene resin | 0.5% | 65 |
| 21 | Dihydroabietyl phthalate | 0.5% | 60 |

We claim:

1. A one-component adhesive for adhesive bonds having increased high-temperature strength, which contains (A) an aqueous dispersion of a copolymer of components:
   (a) from 50 to 98.5%, based on the weight of the copolymer, of (meth) acrylates of alkanols of 1 to 12 carbon atoms,
   (b) from 0.5 to 4%, based on the weight of the copolymer, of a copolymerizable carboxylic acid selected from the group consisting of $\alpha,\beta$-monoelefinically unsaturated carboxylic acid of 3 to 5 carbon atoms, acrylamidoglycollic acid and methacrylamidoglycollic acid,
   (c) from 0 to 10%, based on the weight of the copolymer, of monomers selected from the group consisting of vinyl esters of saturated carboxylic acids of 2 to 4 carbon atoms, styrene, acrylonitrile, methacrylonitrile and butadiene and
   (d) from 0 to 5%, based on weight of the copolymer, of monomers selected from the group consisting of hydroxyalkyl (meth) acrylates where alkyl is of 2 to 8 carbon atoms, amides of carboxylic acids of 3 to 5 carbon atoms, N-hydroxyalkyl amides of carboxylic acids of 3 to 5 carbon atoms and alkoxyalkyl amides of carboxylic acids of 3 to 5 carbon atoms,
   having a glass transition temperature of up to $+40°$ C., and having a solids content of rom 50 to 65% by weight, based on the dispersion, and
   (B) an organic polyamino compound having a molecular weight of from 250 to 15,000 and an amino functionality greater than 5, selected from the group consisting of polyethyleneimines, N,N'-N''-tris-(2-aminoethyl)-melamine and N,N',N''-tris-(6-aminohexyl)-melamine, the weight ratio of copolymer to organic polyamino compound being from 100:0.01 to 100:3.

2. The one-component adhesive of claim 1, wherein dispersion (A) is of a pH of from 3 to 9.

3. The one-component adhesive of claim 1, wherein component (c) is present in an amount greater than 0%.

4. The one-component adhesive of claim 1, wherein component (d) is present in an amount greater than 0%.

5. The one-component adhesive of claim 1, wherein the weight ratio of copolymer to organic polyamino compound is from 100:0.1 to 100:1.5.

6. The one-component adhesive of claim 1, wherein the organic polyamino compound has a molecular weight of from 250 to 10,000.

* * * * *